US006765621B2

(12) United States Patent
Okada

(10) Patent No.: US 6,765,621 B2
(45) Date of Patent: Jul. 20, 2004

(54) COLOR SYSTEM DISCRIMINATOR

(75) Inventor: Masao Okada, Tokyo (JP)

(73) Assignee: NEC Corporation, Tokyo (JP)

( * ) Notice: Subject to any disclaimer, the term of this patent is extended or adjusted under 35 U.S.C. 154(b) by 424 days.

(21) Appl. No.: 09/877,293

(22) Filed: Jun. 8, 2001

(65) Prior Publication Data

US 2002/0044221 A1 Apr. 18, 2002

(30) Foreign Application Priority Data

Jun. 9, 2000 (JP) .......................... 2000-173801

(51) Int. Cl.[7] .......................... H04N 5/455; H04N 5/46; H04N 9/66
(52) U.S. Cl. .................... 348/558; 348/638; 348/726; 348/507; 348/555; 348/557
(58) Field of Search .................... 348/558, 555, 348/554, 556, 557, 726, 724, 638, 507, 705; 329/316, 348; 375/324, 328; 455/337, 180.1, 176.1, 182.1

(56) References Cited

U.S. PATENT DOCUMENTS

| | | | | |
|---|---|---|---|---|
| 4,110,785 A | * | 8/1978 | Dischert et al. | 348/498 |
| 4,121,243 A | * | 10/1978 | Yamaguchi et al. | 348/507 |
| 4,240,102 A | * | 12/1980 | Groeneweg | 348/558 |
| 4,309,719 A | * | 1/1982 | Hinn | 348/555 |
| 4,611,240 A | * | 9/1986 | Harwood | 348/507 |
| 5,119,177 A | * | 6/1992 | Lim | 348/557 |
| 5,267,024 A | * | 11/1993 | Murayama | 348/643 |
| 5,351,089 A | * | 9/1994 | Matsumoto et al. | 348/497 |
| 5,459,524 A | * | 10/1995 | Cooper | 348/507 |
| 5,461,428 A | * | 10/1995 | Yoo | 348/558 |
| 5,510,855 A | * | 4/1996 | Kawakami et al. | 348/695 |
| 5,512,960 A | * | 4/1996 | Hatano | 348/640 |
| 5,615,411 A | * | 3/1997 | Abbey | 455/206 |
| 5,654,767 A | * | 8/1997 | Ikeda et al. | 348/638 |
| 5,654,768 A | * | 8/1997 | Hatano | 348/640 |
| 5,673,088 A | * | 9/1997 | Nah | 348/555 |
| 5,796,442 A | * | 8/1998 | Gove et al. | 348/556 |
| 5,835,157 A | * | 11/1998 | Miyazaki et al. | 348/558 |
| 5,995,169 A | * | 11/1999 | Hatano | 348/726 |
| 6,064,442 A | * | 5/2000 | Aihara | 348/507 |
| 6,215,528 B1 | * | 4/2001 | Lin et al. | 348/641 |
| 6,307,595 B1 | * | 10/2001 | Limberg | 348/558 |
| 6,483,553 B1 | * | 11/2002 | Jung | 348/731 |

FOREIGN PATENT DOCUMENTS

JP          61-39692          2/1986

* cited by examiner

*Primary Examiner*—Michael H. Lee
*Assistant Examiner*—Jean W. Désir
(74) *Attorney, Agent, or Firm*—Choate, Hall & Stewart

(57) ABSTRACT

A color system discriminator is provided with a frequency detector, a vertical-synchronizing frequency detector, a plurality of color demodulators, a demodulating switch, and a controller. The type of the color system of a received signal is determined with reference not only to the burst lock frequency indicated in the tuner detection signal and the phase of the R-Y color difference signal of the image signal, but also to the frequency of the sound carrier signal and the vertical synchronizing frequency.

18 Claims, 2 Drawing Sheets

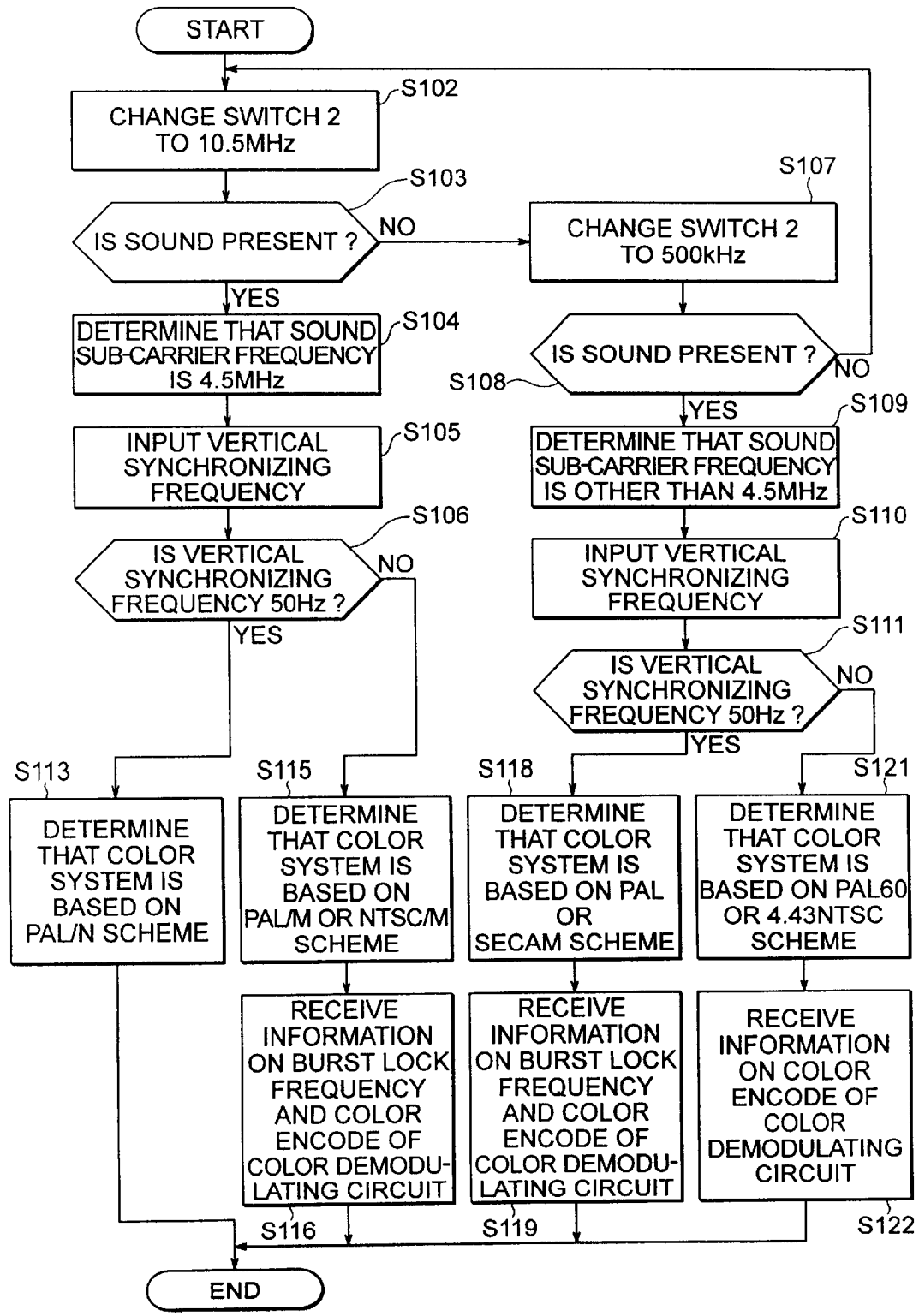

COLOR SYSTEM DISCRIMINATOR

BACKGROUND OF THE INVENTION

1. Field of the Invention

The present invention relates to a color system discriminator for automatically discriminating a color system from a tuner detection signal, and more particularly to a color system discriminator that has improved accuracy of discrimination.

2. Description of the Related Art

Color system having various specifications such as the NTSC (National Television System Committee) scheme, the PAL (Phase alternation by Line) scheme, and the SECAM (Sequential a memoir) scheme is employed in various places all over the world. Accordingly, if the color system of an input tuner detection signal is different from that of a color demodulating circuit provided with the television, a television image would be out of phase or provided with no color. Thus, in order to make the television available for worldwide use, it is therefore necessary to equip the television with a color demodulating circuit for each type of worldwide color system to make the television compatible with the various types of the color system. It is also necessary to select an available color demodulating circuit by automatically discriminating a color system indicated in an input tuner detection signal or by setting the color system manually.

However, to set the color system manually, the user needs to have knowledge specific to the operation of the television. Furthermore, suppose that the television is used where several types of color system are employed and the color system indicated in a tuner detection signal to be inputted into the television is changed from time to time. In this case, it is necessary to set the color system manually each time it changes. These operations are extremely annoying for the user. Accordingly, the television system equipped with a color system discriminator for automatically discriminating between types of the color system has been desired.

A prior method for automatically discriminating a color system in the television is as follows. For example, a color system is determined based on information such as the burst lock frequency of the color system from the input tuner detection signal or the phase of the demodulated R-Y color difference signal.

However, in some cases, an input tuner detection signal that is weak in level or received in a bad condition due to noise would cause the burst lock frequency to be detected in an erroneous manner. In such a case, it could happen to select a color demodulating circuit that is different from the one based on the color system indicated in the input tuner detection signal. In particular, an input tuner detection signal that is weak in level would cause the television to detect the correct burst lock frequency only intermittently in some cases. In such a case, the setting of the color demodulating circuit of the television is changed intermittently. This would cause intermittent color flashing to appear on the screen and the vertical synchronization to become unstable leading to an out-of-phase image appearing on the screen.

SUMMARY OF THE INVENTION

It is an object of the present invention to provide a color system discriminator that can reduce erroneous detection of the color system indicated in an input tuner detection signal.

According to the present invention, a color system discriminator comprises: a frequency detector which detects whether a frequency of a sound carrier signal included in a tuner detection signal is 4.5 MHz; a vertical-synchronizing frequency detector which detects a vertical synchronizing frequency of an image signal included in the tuner detection signal; a plurality of color demodulators which demodulate the image signal in accordance with a predetermined type of the color system different from one another; a demodulating switch which outputs the tuner detection signal to any one of the plurality of color demodulators; and a controller which controls the demodulating switch. Each of the color demodulators determines whether the image signal is based on the predetermined type in accordance with a burst lock frequency of the image signal. The controller determines a type of the color system in accordance with a detection result provided by the frequency detector, the vertical synchronizing frequency, and a determination result provided by the color demodulators.

According to the present invention, the type of the color system is determined with reference not only to the burst lock frequency indicated in the tuner detection signal and the phase of the R-Y color difference signal of the image signal, but also to the frequency of the sound carrier signal and the vertical synchronizing frequency. This makes it possible to determine the color system in accordance with a plurality of conditions, thereby allowing the erroneous detection of types of the color system indicated in the tuner detection signal to be reduced.

BRIEF DESCRIPTION OF THE DRAWINGS

FIG. 2 is a flowchart illustrating the operation of the color system discriminator according to the embodiment of the present invention.

DETAILED DESCRIPTION OF THE PREFERRED EMBODIMENT

Figure 1:
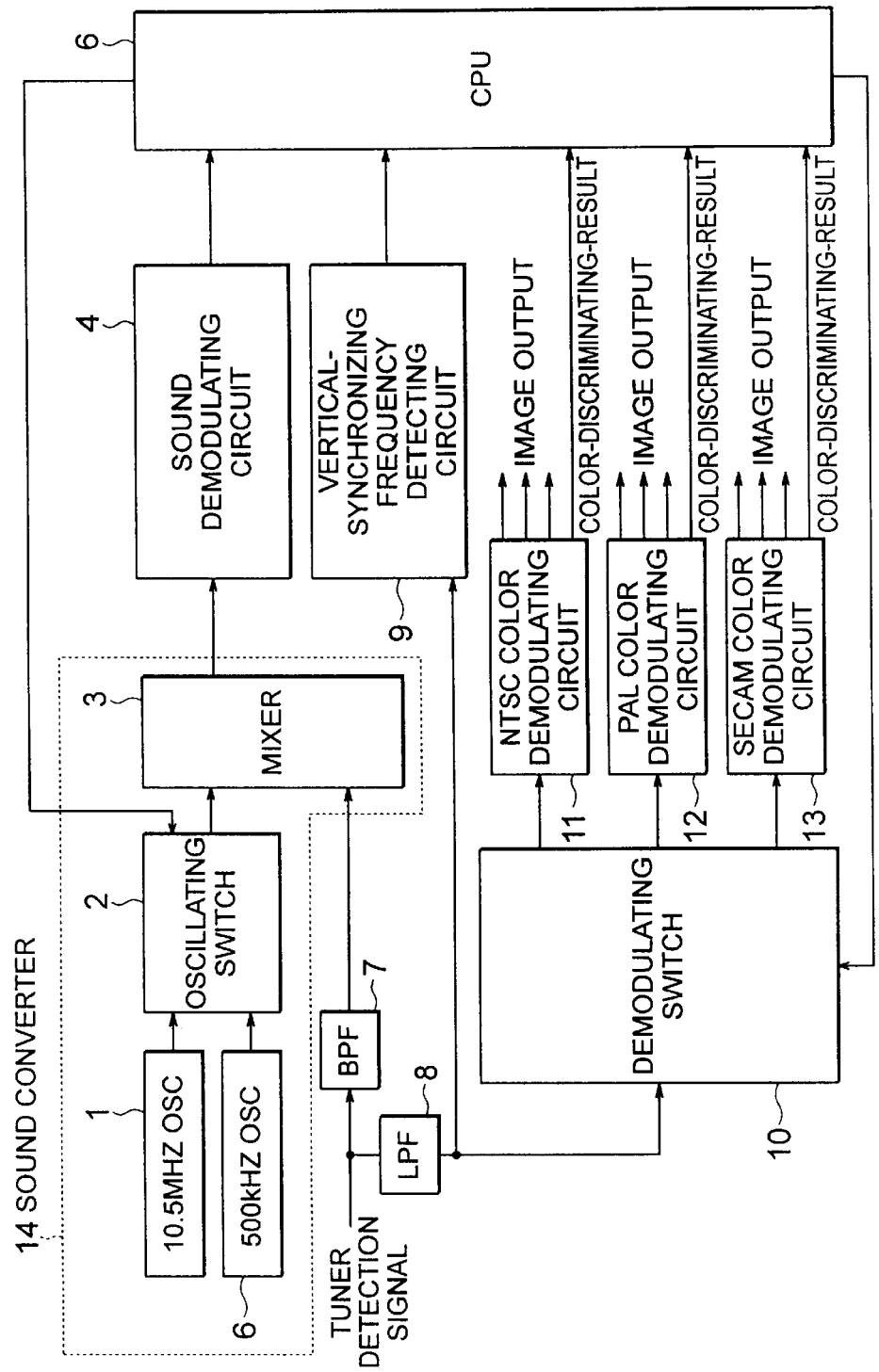
FIG. 1 is a block diagram illustrating the configuration of a color system discriminator according to an embodiment of the present invention.

Now, the present invention will be explained below in more detail with reference to the accompanying drawings in accordance with the embodiment. FIG. 1 is a block diagram illustrating the configuration of a color system discriminator according to the embodiment of the present invention.

For example, as shown in FIG. 1, a color system discriminator, according to the embodiment, is provided with a sound demodulating circuit 4, a central processing unit (CPU) 5, a vertical-synchronizing frequency detecting circuit 9, a band pass filter (BPF) 7, a low pass filter (LPF) 8, a demodulating switch 10, an NTSC color demodulating circuit 11, a PAL color demodulating circuit 12, a SECAM color demodulating circuit 13, and a sound converter 14.

A tuner detection signal detected by a tuner (not shown) is inputted to the band pass filter 7. The band pass filter 7 extracts a sound carrier signal within the frequency band limit of 4.5 MHz to 6.5 MHz.

The sound converter 14 is provided with, for example, a 10.5 MHz oscillator 1, a 500 kHz oscillator 6, an oscillating switch 2, and a mixer 3. The 10.5 MHz oscillator 1 outputs a sinusoidal signal having a frequency of 10.5 MHz. The 500 kHz oscillator 6 outputs a sinusoidal signal having a frequency of 500 kHz. The oscillating switch 2 receives a signal outputted from the 10.5 MHz oscillator 1 and a signal outputted from the 500 kHz oscillator 6, and then outputs a signal while switching between the two signals at certain time intervals controlled by the CPU 5. That is, the period during which the 10.5 MHz signal is outputted (a first period) and the period during which the 500 kHz signal is outputted (a second period) are repeated alternately.

The mixer 3 receives a sinusoidal signal outputted from the oscillating switch 2 and the sound carrier signal outputted from the band pass filter 7. Then, the mixer 3 mixes these signals to output the resulting signal within a frequency band limit of 6 MHz. More specifically, if a sound carrier signal is provided at a frequency of 4.5 MHz, the mixer 3 outputs a frequency-converted signal of 6 MHz when the oscillating switch 2 is coupled to the 10.5 MHz oscillator 1. On the other hand, if sound carrier signals is provided other than at a frequency of 4.5 MHz, the mixer 3 outputs a frequency-converted signal of 6 MHz when the oscillating switch 2 is coupled to the 500 kHz oscillator 6.

For example, suppose a sound carrier signal outputted from the band pass filter 7 has a frequency of 4.5 MHz. In this case, the mixer 3 outputs a signal of 6 MHz frequency-converted during a sinusoidal signal of 10.5 MHz being received. On the other hand, when a sound carrier signal outputted from the band pass filter 7 has a frequency of 5.5 MHz, the mixer 3 outputs a signal of 6 MHz frequency-converted during a sinusoidal signal of 500 kHz being received. Moreover, suppose a sound carrier signal outputted from the band pass filter 7 has a frequency of 6.5 MHz. In this case, the mixer 3 outputs a signal of 6 MHz frequency-converted during a sinusoidal signal of 500 kHz being received. When a sound carrier signal outputted from the band pass filter 7 has a frequency of 6 MHz, the mixer 3 outputs the signal unchanged.

The sound demodulating circuit 4 demodulates a sound carrier signal outputted from the mixer 3. The sound demodulating circuit 4 also determines that a sound is available when the mixer 3 has outputted the signal of 6 MHz, whereas determining that no sound is available when the mixer 3 has not outputted the signal of 6 MHz. The sound demodulating circuit 4 outputs the sound discrimination result indicative of the presence or absence of sound to the CPU 5.

Thus, if a sound carrier signal, included in a tuner detection signal, is provided at a frequency of 4.5 MHz, the sound demodulating circuit 4 outputs a sound discrimination result indicative of the presence of sound while the oscillating switch 2 outputs a signal of 10.5 MHz, whereas the sound demodulating circuit 4 outputs a sound discrimination result indicative of the absence of sound while the oscillating switch 2 has outputs a signal of 500 kHz. On the other hand, if a sound carrier signal, included in a tuner detection signal, is provided other than at a frequency of 4.5 MHz, the sound demodulating circuit 4 outputs a sound discrimination result indicative of the presence of sound while the oscillating switch 2 outputs a signal of 500 kHz, whereas the sound demodulating circuit 4 outputs a sound discrimination result indicative of the absence of sound while the oscillating switch 2 outputs a signal of 10.5 MHz. A frequency detecting circuit (frequency detector), according to this embodiment, may be composed of the sound converter 14 and the sound demodulating circuit 4, as described above.

The low pass filter 8 eliminates a sound sub-carrier signal component from the tuner detection signal and outputs the resulting signal as an image signal. The vertical-synchronizing frequency detecting circuit 9 receives the signal outputted from the low pass filter 8, and then separates the horizontal and vertical synchronizing signals from the signal to determine the vertical synchronizing frequency and outputs the determined result. The demodulating switch 10 outputs the signal outputted from the low pass filter 8 to either the NTSC color demodulating circuit 11, the PAL color demodulating circuit 12, or the SECAM color demodulating circuit 13 in accordance with the control of the CPU 5.

The NTSC color demodulating circuit 11 performs color demodulation based on the NTSC scheme in accordance with the signal outputted from the demodulating switch 10. In addition, suppose that the burst lock frequency of the signal outputted from the demodulating switch 10 is based on the NTSC scheme and the phase of the R-Y color difference signal has not varied at each scan line. In this case, the NTSC color demodulating circuit 11 determines that the signal is based on the NTSC scheme and outputs a color discrimination result indicative of the presence of color. In all other cases, the NTSC color demodulating circuit 11 outputs a color discrimination result indicative of the absence of color.

The PAL color demodulating circuit 12 performs color demodulation based on the PAL scheme in accordance with the signal outputted from the demodulating switch 10. In addition, suppose that the burst lock frequency of the signal outputted from the demodulating switch 10 is based on the PAL scheme and the phase of the R-Y color difference signal has varied at each scan line. In this case, the PAL color demodulating circuit 12 determines that the signal is based on the PAL scheme and outputs a color discrimination result indicative of the presence of color. In all other cases, the PAL color demodulating circuit 12 outputs a color discrimination result indicative of the absence of color.

The SECAM color demodulating circuit 13 performs color demodulation based on the SECAM scheme in accordance with the signal outputted from the demodulating switch 10. In addition, suppose that the burst lock frequency of the signal outputted from the demodulating switch 10 is based on the SECAM scheme. In this case, the SECAM color demodulating circuit 13 determines that the signal is based on the SECAM scheme and outputs a color discrimination result indicative of the presence of color. In all other cases, the SECAM color demodulating circuit 13 outputs a color discrimination result indicative of the absence of color.

The CPU 5 determines which scheme the tuner detection signal is based on in accordance with the information, such as the frequency of the sound carrier signal derived from the sound discrimination result outputted from the sound demodulating circuit 4, the vertical synchronizing frequency outputted from the vertical-synchronizing frequency detecting circuit 9, and the color discrimination result outputted from each of the color demodulating circuits 11 to 13. For reference purposes, shown in Table 1 are the sound sub-carrier frequency and the vertical synchronizing frequency of each color system provided by the worldwide surface-wave broadcast systems. In addition, Table 2 shows the sound sub-carrier frequency and the burst lock frequency (color sub-carrier frequency) of each color system.

TABLE 1

| | Vertical synchronizing frequency | |
|---|---|---|
| | 50 Hz | 60 Hz |
| Sound sub-carrier frequency | | |
| 4.5 MHz (Japan, USA, South and Central America area) | PAL/N | NTSC/N, PAL/N |
| 4.5 MHz (5.5 MHz, 6 MHz, 6.5 MHz; Europe, Asia, Near and Middle East area) | PAL/B, G, D, K, I; SECAM/B, G, D, K | PAL60 (B, G, D, K, I), 4.43NTSC (B, G, D, K, I) |

TABLE 2

| | Sound sub-carrier frequency | | | |
|---|---|---|---|---|
| | 4.5M | 5.5M | 6M | 6.5M |
| Color carrier frequency (color burst frequency) | | | | |
| 3.579545 MHz | NTSC/M | Not available | Not available | Not available |
| 3.57561 MHz | PAL/M | Not available | Not available | Not available |
| 3.582056 MHz | PAL/N | Not available | Not available | Not available |
| 4.43 MHz | Not available | 4.43NTSC, PAL/B, G | PAL/I | PAL/D, K |
| 4.406 MHz, 4.25 MHz | Not available | SECAM/ B, G | Not available | SECAM/ D, |

Incidentally, suppose that the sound demodulating circuit 4 has outputted a result indicative of the presence of sound with the oscillating switch 2 being coupled to the 10.5 MHz oscillator 1. In this case, the CPU 5 determines that the sound carrier signal has a frequency of 4.5 MHz. On the other hand, when the sound demodulating circuit 4 has outputted a result indicative of the presence of sound with the oscillating switch 2 being coupled to the 500 kHz oscillator 6, the CPU 5 determines that the sound carrier signal has a frequency other than 4.5 MHz.

Now, the operation of the color system discriminator configured as described above, according to this embodiment, will be explained below. FIG. 2 is a flowchart illustrating the operation of the color system discriminator according to the embodiment of the present invention.

First, the CPU 5 switches the oscillating switch 2 so as to output a sinusoidal signal of 10.5 MHz (step S102). The sound demodulating circuit 4 checks whether sound is present (step S103). If a signal of 6 MHz has been inputted from the mixer 3, the sound demodulating circuit 4 determines that sound is present and then sends a sound discrimination result indicative of the presence of sound to the CPU 5 (step S104). If the signal of 6 MHz has not been inputted from the mixer 3 in step S103, the sound demodulating circuit 4 sends a sound discrimination result indicative of the absence of sound to the CPU 5. Thereafter, the CPU 5 switches the oscillating switch 2 so as to output a sinusoidal signal of 500 kHz (step S107).

After step S104, the CPU 5 receives a vertical synchronizing frequency from the vertical-synchronizing frequency detecting circuit 9 (step S105) and then checks whether the vertical synchronizing frequency is 50 Hz (step S106). If the vertical synchronizing frequency is 50 Hz, the CPU 5 determines that the color system of the tuner detection signal is based on the PAL/N scheme and then switches the demodulating switch 10 to the PAL color demodulating circuit 12 (step S113).

If it has been found in step S106 that the vertical synchronizing frequency is not 50 Hz, the CPU 5 determines that the color system of the tuner detection signal is based on the PAL/M or NTSC/M scheme (step S115). Thereafter, the CPU 5 switches the demodulating switch 10 to the NTSC color demodulating circuit 11. Suppose that the burst frequency is 3.579545 MHz and the phase of the encoded R-Y color difference signal is not inverted at each scan line. In this case, the NTSC color demodulating circuit 11 outputs a color discrimination result indicative of the presence of color. The CPU 5 receives the color discrimination result outputted from the NTSC color demodulating circuit 11. If the color discrimination result is indicative of the presence of color, the CPU 5 determines that the color system of the tuner detection signal is based on the NTSC/M scheme and then allows the demodulating switch 10 to remain coupled to the NTSC color demodulating circuit 11.

On the other hand, if the color discrimination result is indicative of the absence of color, the CPU 5 switches the demodulating switch 10 to the PAL color demodulating circuit 12. When the burst frequency is 3.575611 MHz and the phase of the encoded R-Y color difference signal is inverted at each scan line, the PAL color demodulating circuit 12 outputs a color discrimination result indicative of the presence of color. The CPU 5 receives the color discrimination result outputted from the PAL color demodulating circuit 12. If the color discrimination result is indicative of the presence of color, the CPU 5 determines that the color system of the tuner detection signal is based on the PAL/M scheme and then allows the demodulating switch 10 to remain coupled to the PAL color demodulating circuit 12 (step S116).

After step S107, the CPU 5 checks whether the sound demodulating circuit 4 has detected the presence of sound (step S108). In the presence of sound, the CPU 5 determines that the sound sub-carrier frequency is other than 4.5 MHz (step S109). In the absence of sound, the CPU 5 switches the oscillating switch 2 again so as to output a sinusoidal signal of 10.5 MHz (step S102).

After step S109, the CPU 5 receives a vertical synchronizing frequency from the vertical-synchronizing frequency detecting circuit 9 (step S110) and then checks whether the vertical synchronizing frequency is 50 Hz (step S111). If the vertical synchronizing frequency is 50 Hz, the CPU 5 determines that the color system of the tuner detection signal is based on the PAL scheme or SECAM scheme (step S118). Then, the CPU 5 switches the demodulating switch 10 to the PAL color demodulating circuit 12. If the burst frequency is 4.43 MHz and the phase of the encoded R-Y color difference signal is inverted at each scan line, the PAL color demodulating circuit 12 outputs a color discrimination result indicative of the presence of color. The CPU 5 receives the color discrimination result outputted from the PAL color demodulating circuit 12. If the color discrimination result is indicative of the presence of color, the CPU 5 determines that the color system of the tuner detection signal is based on the PAL scheme and then allows the demodulating switch 10 to remain coupled to the PAL color demodulating circuit 12.

On the other hand, if the color discrimination result is indicative of the absence of color, the CPU 5 switches the demodulating switch 10 to the SECAM color demodulating circuit 13. Having detected a color sub-carrier frequency of 4.25 MHz or 4.406 MHz as a burst frequency, the SECAM color demodulating circuit 13 outputs a color discrimination result indicative of the presence of color, and a color discrimination result indicative of the absence of color in all other cases. The CPU 5 receives the color discrimination result outputted from the SECAM color demodulating circuit 13. If the color discrimination result is indicative of the presence of color, the CPU 5 determines that the color system of the tuner detection signal is based on the SECAM scheme and then allows the demodulating switch 10 to remain coupled to the SECAM color demodulating circuit 13 (step S119).

If it has been found in step S111 that the vertical synchronizing frequency is not 50 Hz, the CPU 5 determines that the color system of the tuner detection signal is based on the PAL60 or 4.43 NTSC scheme (step S121). Thereafter, the CPU 5 switches the demodulating switch 10 to the PAL color demodulating circuit 12. Suppose that the burst frequency is 4.43 MHz and the phase of the encoded R-Y color difference signal is inverted at each scan line. In this case, the PAL color demodulating circuit 12 outputs a color discrimination result indicative of the presence of color, and a color discrimination result indicative of the absence of color in all other cases. The CPU 5 receives the color discrimination result outputted from the PAL color demodulating circuit 12. If the color discrimination result is indicative of the presence of color, the CPU 5 determines that the color system of the tuner detection signal is based on the PAL60 scheme and then allows the demodulating switch 10 to remain coupled to the PAL color demodulating circuit 12.

On the other hand, with the color discrimination result indicative of the absence of color, the CPU 5 switches the demodulating switch 10 to the NTSC color demodulating circuit 11. When the burst frequency is 4.43 MHz and the phase of the encoded R-Y color difference signal is not inverted at each scan line, the NTSC color demodulating circuit 11 outputs a color discrimination result indicative of the presence of color, and a color discrimination result indicative of the absence of color in all other cases. The CPU 5 receives the color discrimination result outputted from the NTSC color demodulating circuit 11. With the color discrimination result indicative of the presence of color, the CPU 5 determines that the color system of the tuner detection signal is based on the 4.43 NTSC scheme and then allows the demodulating switch 10 to remain coupled to the NTSC color demodulating circuit 11.

In addition, if the color discrimination result if indicative of the absence of color, the CPU 5 switches the demodulating switch 10 to the PAL color demodulating circuit 12 and receives the color discrimination result outputted from the PAL color demodulating circuit 12. If the color discrimination result is indicative of the presence of color, the CPU 5 allows the demodulating switch 10 to remain coupled to the PAL color demodulating circuit 12 (step S122).

As described above, according to this embodiment, the type of the color system is determined with reference not only to the burst lock frequency indicated in the tuner detection signal and a determination of whether the R-Y color difference signal of the image signal is inverted at each scan line, but also to the frequency of the sound sub-carrier signal and the vertical synchronizing frequency. This makes it possible to determine the color system in accordance with a plurality of conditions, thereby allowing the erroneous detection of types of the color system indicated in the tuner detection signal to be reduced. This in turn makes it possible to prevent the occurrence of an abnormal hue and abnormal synchronization on the screen.

What is claimed is:

1. A color system discriminators, comprising:
   a frequency detector which detects whether a frequency of a sound carrier signal included in a tuner detection signal is 4.5 MHz and outputs a frequency detection result;
   a vertical-synchronizing frequency detector which detects a vertical synchronizing frequency of an image signal included in said tuner detection signal;
   a plurality of color demodulators which demodulate said image signal in accordance with a predetermined type of color system different from one another, each of said color demodulators determining whether said image signal is based on said predetermined type in accordance with a burst lock frequency of said image signal and outputting a color determination result;
   a demodulating switch which outputs said tuner detection signal to any one of said plurality of color demodulators; and
   a controller which controls said demodulating switch, said controller determining a type of color system in accordance with said frequency detection result provided by said frequency detector, said vertical synchronizing frequency, and said color determination result provided by said color demodulators.

2. The color system discriminator according to claim 1, wherein at least one of said plurality of color demodulators determines whether said image signal is based on said predetermined type in accordance with not only said burst lock frequency but also a determination of whether an R-Y color difference signal of said image signal is inverted at each scan line.

3. The color system discriminator according to claim 2, wherein said type of said color system includes at least one scheme selected from the group consisting of the NTSC scheme, PAL scheme, and SECAM scheme.

4. The color system discriminator according to claim 1, wherein said type of said color system includes at least one scheme selected from the group consisting of the NTSC scheme, PAL scheme, and SECAM scheme.

5. The color system discriminator according to claim 1, further comprising a band pass filter which extracts said sound carrier signal from said tuner detection signal within a frequency band limit of 4.5 MHz to 6.5 MHz.

6. The color system discriminator according to claim 1, further comprising a low pass filter which eliminates a sound sub-carrier signal component from said tuner detection signal to extract said image signal.

7. A color system discriminator, comprising:
   a frequency detector which detects whether a frequency of a sound carrier signal included in a tuner detection signal is 4.5 MHz;
   a vertical-synchronizing frequency detector which detects a vertical synchronizing frequency of an image signal included in said tuner detection signal;
   a plurality of color demodulators which demodulate said image signal in accordance with a predetermined type of color system different from one another, each of said color demodulators determining whether said image signal is based on said predetermined type in accordance with a burst lock frequency of said image signal;
   a demodulating switch which outputs said tuner detection signal to any one of said plurality of color demodulators; and
   a controller which controls said demodulating switch, said controller determining a type of color system in accordance with a detection result provided by said frequency detector, said vertical synchronizing frequency, and a determination result provided by said color demodulators;
   wherein said frequency detector comprises:
   a first oscillator which provides a sinusoidal signal of 10.5 MHz;
   a second oscillator which provides a sinusoidal signal of 500 kHz;
   an oscillating switch which outputs an output signal of said first oscillator or an output signal of said second oscillator, said oscillating switch being controlled by said controller;
   a mixer which mixes said output signal of said oscillating switch and said sound carrier signal to output a resulting signal within a frequency band limit of 6 MHz; and a sound demodulator which outputs a sound discrimination result indicative of the presence of sound to said controller when said mixer outputs a signal, and outputs a sound discrimination result indicative of the absence of sound to said controller when said mixer dose not output a signal.

8. The color system discriminator according to claim 7, wherein said type of said color system includes at least one scheme selected from the group consisting of the NTSC scheme, PAL scheme, and SECAM scheme.

9. A color system discriminator, comprising:

a frequency detector which detects whether a frequency of a sound carrier signal included in a tuner detection signal is 4.5 MHz;

a vertical-synchronizing frequency detector which detects a vertical synchronizing frequency of an image signal included in said tuner detection signal;

a plurality of color demodulators which demodulate said image signal in accordance with a predetermined type of color system different from one another, each of said color demodulators determining whether said image signal is based on said predetermined type in accordance with a burst lock frequency of said image signal;

a demodulating switch which outputs said tuner detection signal to any one of said plurality of color demodulators; and a controller which controls said demodulating switch, said controller determining a type of color system in accordance with a detection result provided by said frequency detector, said vertical synchronizing frequency, and a determination result provided by said color demodulators;

wherein at least one of said plurality of color demodulators determines whether said image signal is based on said predetermined type in accordance with not only said burst lock frequency but also a determination of whether an R-Y color difference signal of said image signal is inverted at each scan line; and wherein said frequency detector comprises:

a first oscillator which provides a sinusoidal signal of 10.5 MHz;

a second oscillator which provides a sinusoidal signal of 500 kHz;

an oscillating switch which outputs an output signal of said first oscillator or an output signal of said second oscillator, said oscillating switch being controlled by said controller;

a mixer which mixes said output signal of said oscillating switch and said sound carrier signal to output a resulting signal within a frequency band limit of 6 MHz; and a sound demodulator which outputs a sound discrimination result indicative of the presence of sound to said controller when said mixer outputs a signal, and outputs a sound discrimination result indicative of the absence of sound to said controller when said mixer dose not output a signal.

10. The color system discriminator according to claim 9, wherein said type of said color system includes at least one scheme selected from the group consisting of the NTSC scheme, PAL scheme, and SECAM scheme.

11. A color system discriminator, comprising:

a frequency detector which detects a frequency of a sound carrier signal included in a tuner detection signal and outputs a frequency detection result;

a vertical-synchronizing frequency detector which detects a vertical synchronizing frequency of an image signal included in said tuner detection signal;

a plurality of color demodulators which demodulate said image signal in accordance with a predetermined type of color system different from one another, each of said color demodulators determining whether said image signal is based on said predetermined type in accordance with a burst lock frequency of said image signal and outputting a color determination result;

a demodulating switch which outputs said tuner detection signal to any one of said plurality of color demodulators; and a controller which controls said demodulating switch, said controller determining a type of color system in accordance with said frequency detection result provided by said frequency detector, said vertical synchronizing frequency, and said color determination result provided by said plurality of color demodulators.

12. The color system discriminator according to claim 11, wherein at least one of said plurality of color demodulators determines whether said image signal is based on said predetermined type in accordance with not only said burst lock frequency but also a determination of whether an R-Y color difference signal of said image signal is inverted at each scan line.

13. The color system discriminator according to claim 11, wherein said frequency detector comprises:

a first oscillator which provides a sinusoidal signal of a first frequency;

a second oscillator which provides a sinusoidal signal of a second frequency;

an oscillating switch which outputs an output signal of said first oscillator or an output signal of said second oscillator, said oscillating switch being controlled by said controller;

a mixer which mixes said output signal of said oscillating switch and said sound carrier signal to output a resulting signal within a frequency band limit; and a sound demodulator which outputs a sound discrimination result indicative of the presence of sound to said controller when said mixer outputs a signal, and outputs a sound discrimination result indicative of the absence of sound to said controller when said mixer dose not output a signal.

14. The color system discriminator according to claim 11, wherein said type of said color system includes at least one scheme selected from the group consisting of the NTSC scheme, PAL scheme, and SECAM scheme.

15. The color system discriminator according to claim 11, further comprising a band pass filter which extracts said sound carrier signal from said tuner detection signal within a frequency band limit of 4.5 MHz to 6.5 MHz.

16. The color discriminator according to claim 11, further comprising a low pass filter which eliminates a sound sub-carrier signal component from said tuner detection signal to extract said image signal.

17. A color system discriminator, comprising:

a frequency detector which detects a frequency of a sound carrier signal included in a tuner detection signal and outputs a frequency detection result;

a vertical-synchronizing frequency detector which detects a vertical synchronizing frequency of an image signal included in said tuner detection signal;

a plurality of color demodulators which demodulate said image signal in accordance with a predetermined type of color system different from one another, each of said color demodulators determining whether said image signal is based on said predetermined type in accordance with a burst lock frequency of said image signal and outputting a color determination result;

a demodulating switch which outputs said tuner detection signal to any one of said plurality of color demodulators; and a controller which controls said demodulating switch by determining to which color demodulator said tuner detection signal is added based on said frequency detection result provided by said frequency detector and said vertical synchronizing frequency, and judges a type of color system based on a color determination result output from said determined color demodulator.

18. A television signal color system discriminator, comprising:

sound detection means which discriminates whether or not there is a sound based on a sound carrier signal included in a tuner detection signal to be input and a frequency of said sound carrier signal;

vertical-synchronizing frequency detection means which detects a vertical synchronization frequency of an image signal included in said tuner detection signal;

color demodulation means which demodulates said image signal based on a predetermined type of color system and determines whether or not said image signal is a signal of said color system based on whether a value of a burst lock frequency of said image signal or an R-Y color difference signal of said image signal is inverted at each scan line or not; and control means which discriminates said frequency of said sound carrier signal when there is a sound based on a result of decision on presence/absence of a sound by said sound detection means, determines an output of said vertical-synchronizing frequency detection means after frequency discrimination, and determines a type of color system by further determining an output of said color demodulation means based on a result of decision on said output of said vertical-synchronizing frequency detection means.

* * * * *